(12) United States Patent
Lee

(10) Patent No.: US 10,416,401 B2
(45) Date of Patent: Sep. 17, 2019

(54) IN-LINE UNI-DIRECTIONAL OPTICAL TAP DETECTOR

(71) Applicant: DICON FIBEROPTICS, INC., Richmond, CA (US)

(72) Inventor: Ho-Shang Lee, El Sobrante, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 0 days.

(21) Appl. No.: 15/846,641

(22) Filed: Dec. 19, 2017

(65) Prior Publication Data

US 2019/0162921 A1 May 30, 2019

Related U.S. Application Data

(60) Provisional application No. 62/593,132, filed on Nov. 30, 2017.

(51) Int. Cl.
*G02B 6/42* (2006.01)
*G02B 27/14* (2006.01)

(52) U.S. Cl.
CPC ........... *G02B 6/4286* (2013.01); *G02B 6/421* (2013.01); *G02B 6/4212* (2013.01);
(Continued)

(58) Field of Classification Search
CPC .... G02B 6/421; G02B 6/4212; G02B 6/4214; G02B 6/4239; G02B 6/4246; G02B 6/4286; G02B 6/29368; G02B 27/142
See application file for complete search history.

(56) References Cited

U.S. PATENT DOCUMENTS 4,165,496 A * 8/1979 Di Domenico, Jr. ........................ G02B 6/2817 372/31
4,283,113 A * 8/1981 Eden .......... G02F 1/19 356/28.5

(Continued)

FOREIGN PATENT DOCUMENTS

WO WO-2007019231 A2 * 2/2007 ............. G02B 6/421

OTHER PUBLICATIONS

"Variable Optical Attenuators," DiCon Fiberoptics, Inc., [retrieved Jun. 17, 2016], 14 pages, http://web.archive.org/web/20160617191537/http://www.diconfiberoptics.com/products/main_attenuators.php.

*Primary Examiner* — Daniel Petkovsek
(74) *Attorney, Agent, or Firm* — Vierra Magen Marcus LLP

(57) ABSTRACT

In-line uni-directional optical tap detector devices provide optical power monitoring in a small, inexpensive form factor. A pair of optical fibers with angled end surfaces are fusion-spliced or butt-coupled together, with a thin-film coating or coating stack positioned in between the two fiber end surfaces. The thin-film coating or coating stack acts as an optical tap, reflecting a small portion of the optical signal towards a photo-detector affixed to the exterior of the cladding of the fibers, positioned and angled such that the photo-detector measures the optical power of signals propagating in one direction down the fibers, while ignoring signals propagating in the opposite, or reverse direction. Alternately, a V-groove block or fiber holder is used to position and secure the fibers, without requiring fusion splicing, where the reflection of a portion of the optical signal to the photo-detector may be due to Fresnel reflection at the fiber end surfaces.

21 Claims, 4 Drawing Sheets

(52) U.S. Cl.
CPC ......... *G02B 6/4214* (2013.01); *G02B 6/4239* (2013.01); *G02B 27/142* (2013.01)

(56) References Cited

U.S. PATENT DOCUMENTS

| | | | |
|---|---|---|---|
| 5,497,438 A * | 3/1996 | Ishikawa | G02B 6/2817 385/38 |
| 5,537,500 A * | 7/1996 | Yokoyama | G01M 11/35 385/31 |
| 6,081,638 A * | 6/2000 | Zhou | G02B 6/4214 372/108 |
| 6,406,196 B1 * | 6/2002 | Uno | G02B 6/12 385/47 |
| 6,628,856 B1 | 9/2003 | Costello et al. | |
| 6,838,738 B1 | 1/2005 | Costello et al. | |
| 6,843,607 B2 * | 1/2005 | Nakanishi | G02B 6/4246 385/14 |
| 6,892,009 B2 * | 5/2005 | Ito | G02B 6/25 345/173 |
| 7,095,931 B2 * | 8/2006 | Sezerman | C03C 23/0025 385/123 |
| 7,255,497 B2 | 8/2007 | Suzuki et al. | |
| 7,321,703 B2 * | 1/2008 | Fukuyama | G02B 6/4214 385/129 |
| 7,346,240 B1 | 3/2008 | He et al. | |
| 7,412,137 B2 | 8/2008 | Suzuki et al. | |
| 7,600,924 B2 | 10/2009 | Hama et al. | |
| 7,899,330 B2 | 3/2011 | Ye et al. | |
| 9,429,725 B2 * | 8/2016 | Shao | H04B 10/40 |
| 2002/0031299 A1 | 3/2002 | Hatakoshi | |
| 2003/0095756 A1 * | 5/2003 | Tohgoh | G02B 6/4214 385/88 |
| 2004/0120646 A1 | 6/2004 | Fushimi et al. | |
| 2004/0208458 A1 * | 10/2004 | Uno | G02B 6/4214 385/89 |
| 2016/0264460 A1 | 9/2016 | Kufner et al. | |
| 2017/0276877 A1 | 9/2017 | Lee et al. | |
| 2017/0363813 A1 | 12/2017 | Lee et al. | |

* cited by examiner

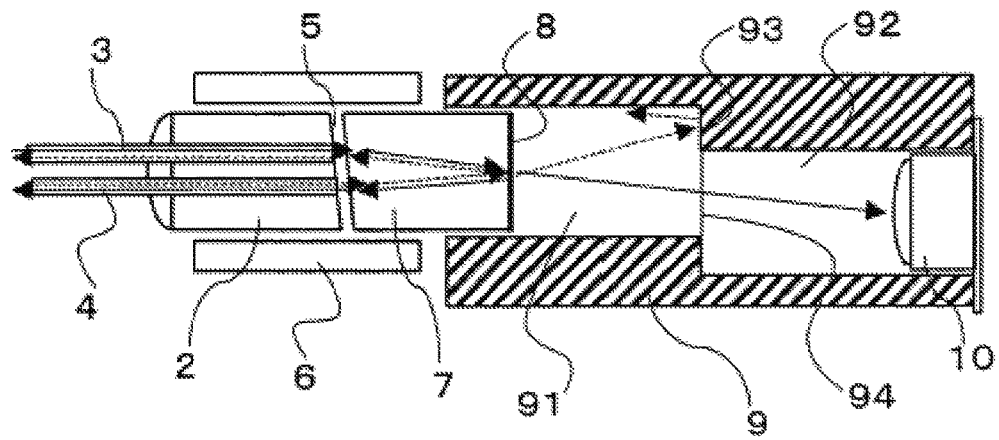
Fig. 1 - Prior Art
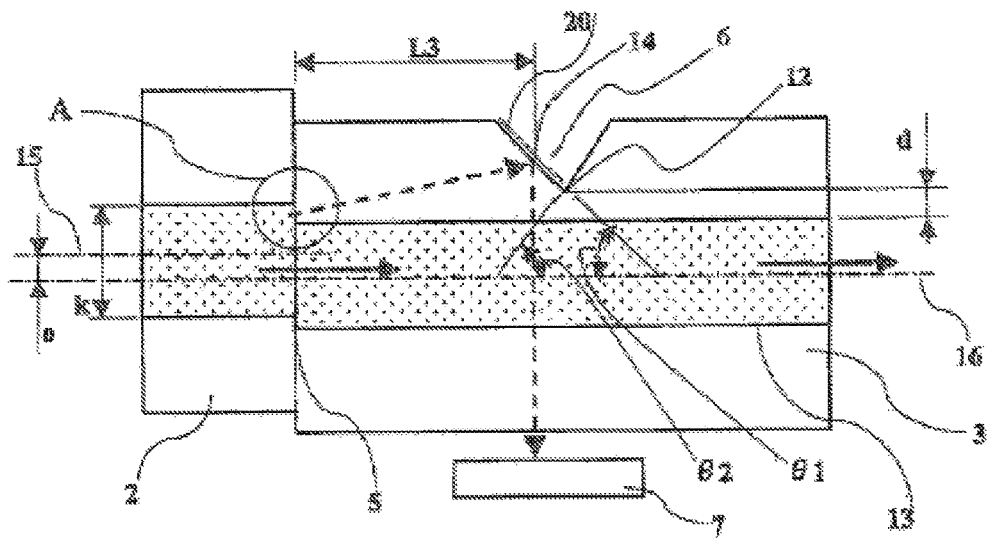
Fig. 2 - Prior Art

IN-LINE UNI-DIRECTIONAL OPTICAL TAP DETECTOR

PRIORITY CLAIM

This application claims the benefit of U.S. provisional Patent App. 62/593,132, filed Nov. 30, 2017, which is hereby incorporated in its entirety by this reference.

BACKGROUND

The following relates generally to the optical components used in optical communication networks, and specifically to optical tap detector devices that provide optical power monitoring and detection of optical signals.

Optical power monitors or tap detectors are widely deployed in optical networks, typically in the 1550 nm or 1310 nm wavelength ranges, as well as other wavelength ranges, in order to measure and manage the optical power of the optical signals that are being transmitted over the network. In some cases, the optical power is being measured in order to adjust the optical power to a desired level. In other cases, the intent is primarily to verify that an optical signal is present.

Typical optical power monitors or tap detectors comprise an optical tap and an optical power detector. The optical tap splits off a small portion of the optical signal. Depending on the optical power levels involved, and the amount of accuracy required, the percentage of the output signal's optical power that is split off might be 1%, 2%, 5%, or even 10%. The split-off optical signal is then directed to an optical detector device, or photo-detector, which converts the optical power to an electrical signal, from which the optical power of the signal can be determined. This information can be used by the network operator, or an intelligent network controller, to adjust the power level of the optical signal, or simply to verify that a signal is present. The remainder of the optical signal (the portion that was not split off and directed to the detector circuit) is than passed on to the rest of the network. The portion of the optical power that was split off by the optical splitter, or tap, represents a source of insertion loss to the desired/intended optical signal. Because the device passes most of the incoming optical signal, an optical tap detector may be considered to be an "in-line" device, in line with the primary optical signal path. The term "in-line" may also be used to refer to devices where the light that is exiting the device is traveling in the same direction as the light that enters the device, without being "redirected" in another direction.

In some applications of optical tap detectors, it is desirable to detect signals that are traveling down the fiber in one direction, while ignoring (i.e., not detecting) optical signals that are traveling in the reverse direction, even though they are traveling on the same fiber, or fibers. This form of tap detector can be referred to as a uni-directional tap detector.

Optical splitters or couplers are widely available components that can be used to provide the optical tap function, with a variety of tap ratios (the percentage of the incoming optical power that is split off to one output of the splitter, with the remainder of the optical power being passed to the other output). Optical power detectors or photo-detectors, such as photodiodes, are also widely available, with a variety of sensitivities. Optical tap-detectors are components that combine the functions of an optical tap, or splitter, with the optical detector. In order to minimize the size and cost of optical networking equipment, it is highly desirable to have optical tap detectors that are small, and inexpensive to manufacture, so that they may be easily integrated into more complex optical modules, or directly into optical networking equipment.

SUMMARY

In one set of embodiments, an optical device includes a photo-detector and first and second optical fibers. The first optical fiber has a core and an end. The second optical fiber has a core and an end to the end of the first optical fiber. The core of the first optical fiber is aligned with the core of the second optical fiber to allow light to propagate through the end of the first optical fiber from the core of the first optical fiber to the core of the second optical fiber through the end of the second optical fiber and to allow light to propagate through the end of the second optical fiber from the core of the second optical fiber to the core of the first optical fiber through the end of the first optical fiber. The optical device also includes an optical joint between the end of the first optical fiber and the end of the second optical fiber, where the photo-detector is bonded to one or both of the first and second optical fibers in an area adjacent to the optical joint. The optical joint is configured to allow light to propagate between the end of the first optical fiber and the end of the second optical fiber and to direct a portion of light propagating from the first optical fiber to be directed to the photo-detector, while substantially blocking light propagating from the second optical fiber from being directed to the photo-detector.

Other embodiments include methods of forming an optical device includes receiving a first optical fiber and a second optical fiber having respective first and second ends. The first and second optical fibers are spliced at the first and second ends at an optical joint so that a core of the first optical fiber is aligned with a core of the second optical fiber. The optical joint is configured to transmit light incident on the optical joint between the cores of the first and second optical fibers, the optical joint further configured reflect a portion of incident light from the first optical fiber. The optical joint is oriented to maximize the portion of incident light from the first optical fiber reflected from the optical joint that is incident on a photo-detector, and to minimize the portion of light incident on the optical joint from the second optical fiber that is incident on the photo-detector. The photo-detector is bonded to one or both of the first and second optical fibers in an area adjacent to the optical joint.

Various aspects, advantages, features and embodiments are included in the following description of examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

FIG. 1 shows a prior art example of a uni-directional optical power monitor, utilizing a GRIN lens and a tap film.

FIG. 2 illustrates another prior art example of an optical power monitor, utilizing two fibers with end faces that are laterally offset from each other.

DETAILED DESCRIPTION

Figure 3A:
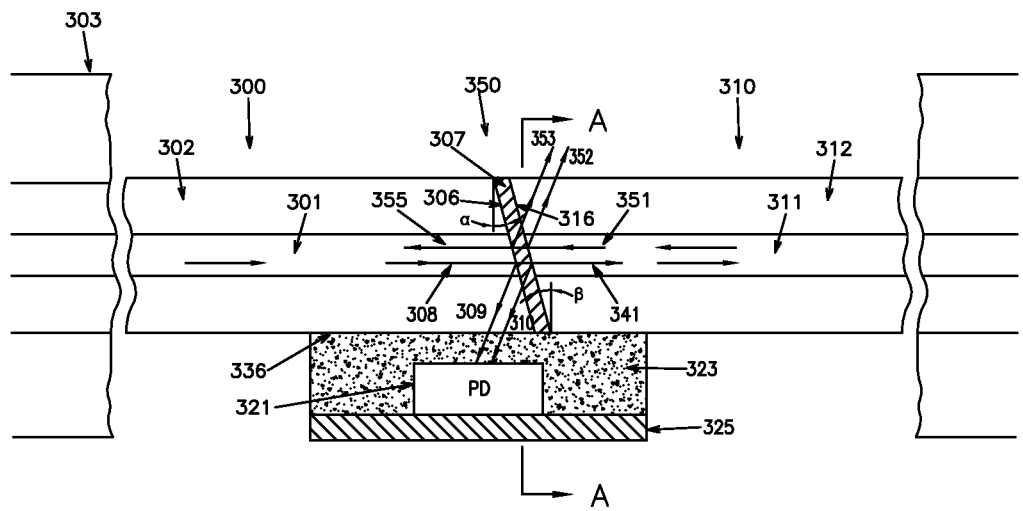
FIG. 3A illustrates an embodiment utilizing two fibers with angled end faces that are fusion-spliced or butt-coupled together, and a photo-detector that is mounted adjacent to the claddings of the fibers.

The following presents embodiments of in-line uni-directional optical tap detector devices that can provide the function of optical power monitoring, in a small, inexpensive form factor. A pair of optical fibers with angled end surfaces are fusion-spliced or butt-coupled together, with a thin-film coating or coating stack positioned in between the two fiber end surfaces. If the fiber ends are butt-coupled together, then epoxy or glue may be used to hold the fiber ends together. The glue may be within the optical joint, between the end surfaces of the two fibers, or it may be around the cladding of the fibers, so as to not be present in the optical path between the cores of the two fibers. The thin-film coating or coating stack may be deposited on either of the fiber end surfaces, prior to the fusion-splicing or butt-coupling process. The thin-film coating or coating stack acts as an optical tap, reflecting a small portion of the optical signal towards a photo-detector that is affixed to the exterior of the cladding of one of the fibers. The positioning and angling of the thin-film tap and the photo-detector are such that the photo-detector measures the optical power of signals propagating in one direction down the fibers, while ignoring signals propagating in the opposite, or reverse direction. The photo-detector provides an electrical signal that is a function of the optical power that is being coupled through the device, in one direction.

In other embodiments, a V-groove block or fiber holder is used to accurately position the two fibers, and to secure them in place, without requiring fusion splicing. In this embodiment, the reflection of a portion of the optical signal to the photo-detector may be due to Fresnel reflection at the fiber end surfaces, resulting from a refractive index difference between the fiber interfaces and air, or between the cores of the two fibers. Alternatively, the reflection may be due to a thin-film tap located between the two fiber end surfaces. Other forms of fiber holders, such as fiber ferrules, or sleeves, are also within the scope of the present invention.

An optical fiber, as used in optical communication systems or networks, includes a transparent core surrounded by a cladding material that has a refraction index that is lower than that of the core. Light is confined in the core by total internal reflection, occurring at the interface of the core and the cladding. If the core of the fiber carries only one propagating mode, then it is called a single-mode fiber. The fiber is called multi-mode fiber if it carries more than one mode of light propagation.

FIG. 1 shows a prior art example of a uni-directional optical power monitor, or tap detector, and is taken from U.S. Pat. No. 7,255,497. Although optical signals may propagate through the device in either direction, for the sake of this discussion, fiber 3 will be referred to as the input fiber, and fiber 4 will be referred to as the output fiber. The intent of this device is to monitor or detect the optical power of signals that enter the input fiber 3, as they are passed to output fiber 4, while ignoring (i.e., not detecting) optical signals that enter the "output" fiber 4.

Input fiber 3 and output fiber 4 are held in a fiber ferrule 2, forming a fiber pigtail. The fiber pigtail is aligned with, and affixed via a sleeve 6, to a GRIN (gradient index) lens 7, with a small air gap 5 between the fiber ferrule 2 and the GRIN lens 7. The end faces of the fiber ferrule 2 and GRIN lens 7 are slightly angled, to prevent unwanted back-reflection.

The GRIN lens 7 is also affixed to an opaque housing 9, which is ideally made of a material that is not only opaque, but also has low reflectivity. This opaque housing 9 has two cylindrical bores, that are offset from each other, as shown in FIG. 1. The GRIN lens bore 91 is offset laterally from the bore 92 that contains a photodiode 10. The end of the GRIN lens 7 that is inside of the housing 9, has been coated with a "tap film" 8, that is partially transmissive within the wavelength range of the optical signals, while reflecting most of the optical power of the optical signals.

Light entering the device from input fiber 3 passes through the GRIN lens 7, and is collimated. Most of this light is reflected by tap film 8, and is then focused by the GRIN lens 7 onto the core of the output fiber 4. However, a small portion of the light passes through the tap film 8, and then passes through the "through hole" 94 that exists between the two bores 91 and 92. This small portion of the light is then detected by photodiode 10.

Light that enters the device from the output fiber 4, also passes through the GRIN lens 7, and is collimated. Most of this light is also reflected by tap film 8, and is then focused by the GRIN lens 7 onto the core of the input fiber 3. As such, the device passes optical signals in both directions. However, in the case of the "reverse direction" light that enters output fiber 4, the small portion that passes through the tap film 8 will end up hitting the intermediate "wall" 93, rather than passing through to the photodiode 10. The light that hits the intermediate wall 93 is either absorbed by the non-reflective material of the housing 9, or else it bounces around the interior of the housing, and is attenuated, without being detected. The device is therefore a uni-directional optical power monitor.

The primary disadvantage of the prior art embodiment of FIG. 1 is that it requires the use of a discrete GRIN lens element, which is fairly bulky, and adds cost. The opaque housing, with its two non-concentric bores, also adds size and cost to the device. In addition, the performance of the device, in particular, its rejection of optical signals traveling in the reverse direction (i.e., entering the device via output fiber 4) depends in large part on the material properties of the opaque housing, and its lack of reflectivity.

The prior art example shown in FIG. 2, taken from U.S. Pat. No. 7,412,137, seeks to address some of the size and cost disadvantages of the prior art example of FIG. 1, by eliminating the use of a discrete lens, as well as the bulky housing. In FIG. 2, the input and output fibers are directly spliced together, via a fusion splicing process. The core of input fiber 2 is represented by the shaded area, and the core of output fiber 3 is also represented by a shaded area. The fusion splice between the input fiber 2 and the output fiber 3 is shown as item 5. As can be seen in FIG. 2, the fusion splicing is done in such a way as to create a lateral offset between the optical axis 15 of the input fiber 2, and the optical axis 16 of the output fiber 3, so that the two optical cores are partially mis-aligned.

Due to this mis-alignment of the two optical cores, a small portion of the light that enters input fiber 2, will be coupled to the cladding of output fiber 3, as depicted by the dashed line in FIG. 2. A V-notch 6 is cut into the exterior cladding of output fiber 3, using a grinding process, forming a reflective surface 14. The small portion of light that is depicted by the dashed line is reflected by reflective surface 14, and directed laterally through (or across) the output fiber 3, where it is detected by photodiode 7, that has been affixed in some way to the exterior cladding of output fiber 3. Meanwhile, the majority of the light that enters the input fiber 2 will pass through the fusion splicing area, to the output fiber 3.

In similar fashion, light that is traveling in the reverse direction (i.e., light that enters output fiber 3) will mostly pass through to the input fiber 2. A small portion will be coupled into the cladding of input fiber 2, due to the mis-alignment of the optical cores. However, this light will either pass harmlessly through the cladding of input fiber 2, or it may eventually be coupled back into the core of input fiber 2. In any case, it will not be coupled or directed to the photodiode 7.

Although the material costs and size of the prior art embodiment of FIG. 2 will be low, one who is skilled in the art of fiberoptic component manufacturing will appreciate that there are several complexities that are inherent in this prior art embodiment. The amount of lateral offset between the two fiber cores must be precisely set during the fusion splicing process, as this will determine the percentage of the input optical power that is fed to the photodiode. The V-notch 6 must also be precisely located and formed, with a high degree of accuracy, and the reflective surface 14 must be flat, reasonably reflective, and have the proper angle. These manufacturing complexities may lead to high cost, low manufacturing yield, and/or performance issues.

The embodiments presented in the following address the disadvantages of the prior art, such as illustrated in the examples of FIGS. 1 and 2. Described embodiments use a structure in which the input and output optical fibers are either spliced together or butt-coupled to each other, or held in place via a simple V-groove block or other form of fiber holder, to achieve a small form factor and low material costs. Such embodiments can therefore provide the same material cost and size advantages as the prior art embodiment of FIG. 2, but avoid the manufacturing complexities of that prior art embodiment, such as the offset alignment of the fusion splice, and the forming of the V-notch and its reflective surface.

FIG. 3A shows an embodiment in which an input optical fiber 300 is spliced or butt-coupled to an output optical fiber 310. In other embodiments, or when being butt-coupled, the fibers can be simply glued together, where the amount of glue entering in to the optical path within the optical joint should usually be minimized as it may darken over time. As in the discussion of the prior art examples of FIGS. 1 and 2, the use of "input" and "output" is arbitrary, as optical signals may flow in both directions through the device. The input and output designations refer to the direction of optical signal propagation that is being monitored or detected. Input optical fiber 300, with optical core 301 and cladding 302, protected by an acrylic buffer 303, has a slanted or angled end surface (or end face), with an angle α that ranges from a few degrees to more than 45 degrees. The slanted end surface of the input fiber 300 is indicated by 306. The output optical fiber 310, with optical core 311 and cladding 312, is slanted with an angle β. The slanted end surface of the output fiber 310 is indicated by 316. In some embodiments, the slant angle β is equal or very close to the slant angle α. However, it is not strictly necessary for the output fiber 310 to have a slanted end surface, and in other embodiments only the input fiber 300 has a slanted end surface. The slant angles α and β of the fiber end surfaces can be created by cleaving or polishing.

A dielectric thin-film or a thin-film stack 307 is applied or coated to either end surface 306 or to end surface 316, to reflect a small percentage of the incoming optical signal 308 to a photo-detector (PD) 321 located beneath and adjacent to the cladding 302, for monitoring the optical power level of the optical signal 308. The photo-detector can be bonded to input fiber, the output fiber, or both in an area adjacent to the optical joint between the input and output fibers, as indicated by 350, and configured so that the reflected portion of the incoming optical signal is incident on the photo-detector. The photo-detector will typically comprise a photodiode, such as a PIN photodiode or an avalanche photodiode. The reflected rays indicate by 309 and 310 in FIG. 3A, and by 332 in FIG. 3B, pass through the outer surface 336 of the cladding 302, as well as an index-matching transparent material 323, for embodiments that include such an index matching material. This index-matching material 323 is intended to reduce the Fresnel back reflection and cylindrical lensing effect caused by the outer surface 336. The index-matching index material 323 can be eliminated if back reflection is not a concern. Note that in FIG. 3A, the reflected rays 309 and 310 are shown as emanating from the two fiber end surfaces 306 and 316, respectively. However, if the thin-film stack 307 comprises multiple layers of dielectric materials, with differing refractive index values, there will also be a series of reflections emanating from the layers within the thin-film stack. The rays shown in the figures are intended to be merely illustrative.

To form the optical joint between the input and output fibers, as indicated by 350, the fiber end surfaces 306 and 316 can be spliced by thermal fusion splicing, or they may be butted physically, with a dielectric thin-film or thin-film stack in between the two fiber ends. The thin film materials can include oxide materials like Ta2O5, Nb2O5, which can be melted with the silica of the fibers during the thermal fusion splicing process, since the melting temperatures of the materials are quite close. As indicated by ray 341, the majority of the signal light 308 passes through the partially-reflective layer 307 to enter the output fiber 310. Note also that if the index of refraction of the output fiber 310 is sufficiently different than the refractive index of the input fiber 300, then a portion of the signal light 308 will be reflected at the angled optical joint toward the photo-detector 321, via Fresnel reflection, even without the benefit of a thin-film coating or thin-film stack. Alternatively, a short stub of fiber with a different core index may be spliced or butt-coupled in between the input fiber 300 and the output fiber 310, with Fresnel reflection taking place at both of the resulting optical joints. If the fiber ends are butt-coupled together, epoxy or glue can be used to securely hold the fiber ends together.

The core diameter 301 of a typical single-mode fiber for optical communication is 9 micrometers. The reflected beam, as indicated by rays 309 and 310, gradually expands to a few tens of micrometers as it passes through the cladding 302 to reach the photo-detector 321, which typically has an active area of a few tens to a hundred micrometers, or even more. Thus, the majority of reflected light 309 and 310 is captured by the photo-detector 321. Other embodiments can use of multi-mode fibers, although the dimensions of the photo-detector may need to be adjusted to reflect the large core diameter of multi-mode fiber.

An optical fiber allows the light to propagate in either direction along the fiber core. The optical signal 351, propagating opposite to the optical signal 308, from the "output" fiber 310 to the "input" fiber 300 (i.e., in the reverse direction as optical signal 308), is also partially reflected (as indicated by rays 352 and 353) at the optical joint 350. The partially reflected light 353 is substantially blocked from being incident on the photo-detector 321. In this embodiment, the reflected light passes through the cladding 312 to the ambient air, and the reflected light is not detected by the photo-detector. In other embodiments, the reflected light can be further directed away from the photo-detector or absorbed by a light absorbent material, or some combination of these. The power monitoring function of the embodiments described here are therefore referred to as being uni-directional. In short, the photo-detector monitors the optical power of signals propagating in one specific direction, and is isolated from signals propagating in the other direction, or reverse direction. Embodiments that monitor signals in both directions can add a second photo-detector for monitoring the reflected signal 352.

When a single layer of dielectric film is coated to the end surface of one of the fibers (either 306 or 316), the difference between its index of refraction and that of the optical fiber, which is basically composed of silica, causes back reflection. Depending on the embodiment, the optical thickness of the thin-film layer can be far less than a quarter wavelength of the optical signal, or, alternatively, to not be close to multiple quarter wavelengths, in order to reduce the wavelength-dependent interference between the two reflected rays 309 and 310. Thus, the dependence on wavelength of the reflectivity is minimized. If a stack of thin films composed of alternating layers of high-index and low-index dielectric materials is applied, its wavelength dependence of reflectivity can be minimized.

Figure 3B:
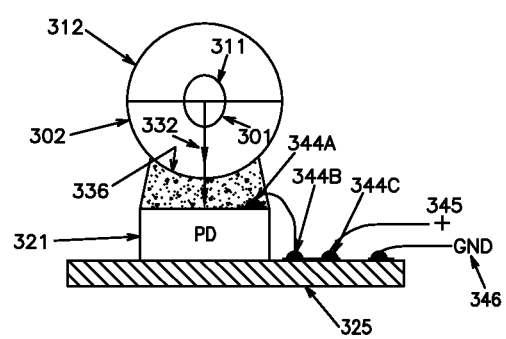
FIG. 3B provides a cross-section view of the embodiment shown in FIG. 3A.

FIG. 3B provides a cross-section view of the embodiment shown in FIG. 3A, taken at the cut line A. As shown in FIG. 3B, the cathode of the photo-detector 321 rests on a substrate 325, which also has electrical routing traces or circuitry on its surface. The photo-detector converts the reflected light 332 to an electrical current, which is carried from the anode electrode of the photo-detector 344A, via conductive wires, to 344B and then to 344C, and on to the positive terminal 345. Positive terminal 345 and ground terminal 346 (connected to the substrate 325) can then be connected to the photo-detector's external load, and circuitry for converting the photo-detector's electrical current to a voltage, and then amplifying the voltage (not shown). The whole embodiment except for the two electrodes 345 and 346 can be encapsulated in a material (not shown) that is chosen to absorb any stray light that comes out of the fiber joint 350 and photo-detector 321.

Figure 4A:
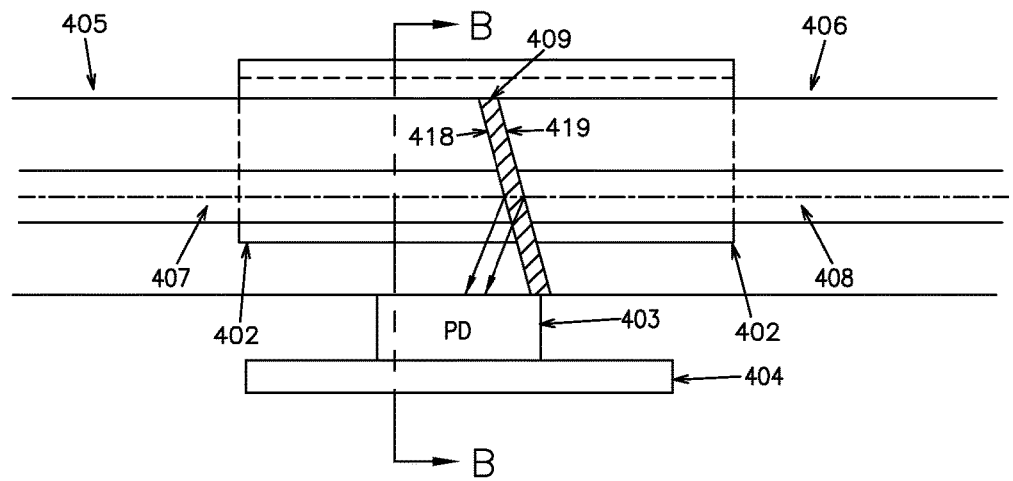
FIG. 4A illustrates another embodiment that utilizes a V-groove block to align and secure the two fibers.
Figure 4B:
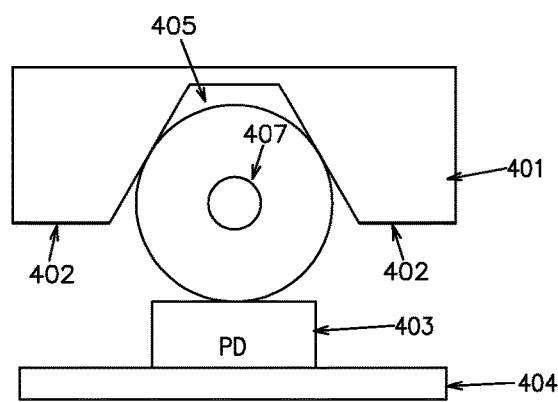
FIG. 4B provides a cross-section view of the embodiment shown in FIG. 4A.

FIG. 4A illustrates another set of embodiments, in which the axes of the two optical fibers 405 and 406 are optically aligned, and then bonded or secured, by use of a block structure, such as inside of a V-groove block 401, without requiring fusion splicing. Rather than a V-groove block as a fiber holder, other embodiments can be used that provide physical supports to hold the fiber ends in place, including a ferrule with a bore in it, or a sleeve of some kind. FIG. 4B provides a cross-section view of the embodiment shown in FIG. 4A, taken at the cut line B. An optical joint 409 is created to partially reflect the light that is propagating along the core 407 of "input" fiber 405, to the photo-detector 403 located beneath the optical joint 409. In this embodiment, the reflection can be just Fresnel reflection at the two end surfaces 418 and 419 of the optical fibers 405 and 406, respectively, if the optical joint 409 is simply a small air gap, instead of a thin-film coating or thin-film coating stack. However, a thin-film coating or thin-film coating stack may also be used in this embodiment, for more precise control of the amount of light that is reflected to the photo-detector 403. Alternatively, if a short stub of optical fiber, with core index of refraction that is different than that of input fiber 405, is inserted between the input fiber 405 and the output fiber 406, the refractive index mismatch will result in Fresnel reflection at the input fiber end surface 418. Further, if the index of refraction of this short fiber stub is also different from the core index of output fiber 406 (as would be the case if the input fiber and output fiber are of the same fiber type), then Fresnel reflection will also occur at the output fiber end surface 419. In all other respects, the operation of the embodiment shown in FIGS. 4A and 4B is as in the operation of the embodiment shown in FIGS. 3A and 3B. Other embodiments can use alternate methods for aligning and securing or holding the two fibers, and creating reflection at the optical joint. For embodiments using glue to secure the fibers, the amount of glue in the optical path at optical joint is usually minimized as the glue may darken over time.

Figure 5:
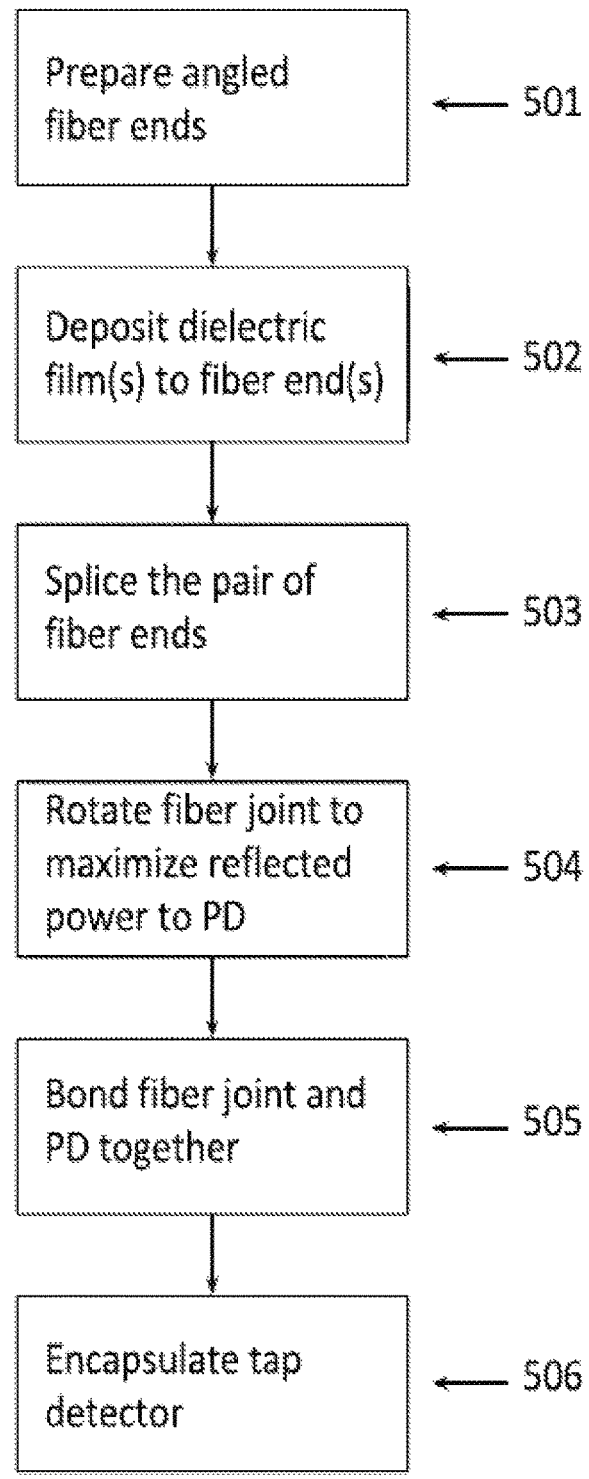
FIG. 5 illustrates the process flow of a method based on the embodiment shown in FIGS. 3A and 3B.

FIG. 5 depicts a flowchart describing an example of an embodiment of a fabrication process for making an in-line uni-directional tap detector. The process flow shown in FIG. 5 is based on the embodiment that is shown in FIGS. 3A and 3B. The process begins by receiving the first and second fibers. In one set of embodiments, beginning at 501 the fiber end surfaces of two fibers, without the outside protective buffer, are cleaved or polished with an angle. At 502, one or both of the fiber end(s) is deposited with a layer or multiple layers of dielectric material(s), whose indexes are different from that of the fiber core.

Then the two fiber ends, where at least one of them is coated with dielectric layer(s), are thermally fused together by arc discharge or micro-torch, to form an optical joint with the axes of the cores of the fibers aligned. Because both the fiber material and the dielectric material(s) are oxides, they can be melted together seamlessly, as in 503. A small portion of light will be back reflected at this optical joint, caused by the index inhomogeneity. The spliced fiber joint is aligned at 504, primarily by rotating the spliced fibers, so that it is proximate to the photo-detector (PD). The spliced fibers are oriented, such as being, rotated and aligned so that light reflected at the spliced fiber joint is directed to the photo-detector, to maximize the coupling of the reflected optical power to the photo-detector.

Then at 505, the photo-detector is bonded to one or both of fibers in an area adjacent to the spliced fiber joint using adhesives, to form a very compact in-line uni-directional tap detector. The photo-detector is electrically connected to two electrodes for conducting the photo-detector current to an external circuit. At 506, the full optical joint as well as the photo-detector is encapsulated in a light absorbent material to absorb any stray light, and also to mechanically protect the optical joint.

In order to fabricate the embodiment shown in FIGS. 4A and 4B, the process is slightly different from the process illustrated in FIG. 5. Instead of using thermal fusion splicing to join the two fiber ends together, a V-groove or other form block is used to hold and align the two fiber ends. One or both of the fiber ends may be coated with one or more layers of dielectric materials, as described in FIG. 5. However, because the V-groove block holds both fiber ends securely in place, it is also possible to simply place a separately-fabricated thin-film tap or filter in between the two fiber ends (also held in place by the V-groove block). Alternatively, an air gap can be left between the two fiber ends, such that the index mismatch between the air and the fiber core results in Fresnel reflection. The process at 504, 505, and 506 are basically the same for this embodiment, as they were described in FIG. 5. However, the rotational alignment of the fiber ends in the V-groove block is done in such a manner as to ensure that the path of the reflected light is not obstructed by the V-groove block, and that there is an appropriate location to bond the photo-detector to the optical joint, as shown in FIGS. 4A and 4B.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

It is claimed:

1. An optical device, comprising:
   a photo-detector;
   a first optical fiber having a core and an end;
   a second optical fiber having a core and an end adjacent to the end of the first optical fiber, the core of the first optical fiber aligned with the core of the second optical fiber to allow light to propagate through the end of the first optical fiber from the core of the first optical fiber to the core of the second optical fiber through the end of the second optical fiber and to allow light to propagate through the end of the second optical fiber from the core of the second optical fiber to the core of the first optical fiber through the end of the first optical fiber; and
   an optical joint between the end of the first optical fiber and the end of the second optical fiber, the photo-detector bonded to one or both of the first and second optical fibers in an area adjacent to the optical joint, wherein the optical joint is configured to allow light to propagate between the end of the first optical fiber and the end of the second optical fiber and to direct a portion of light propagating from the first optical fiber to be directed to the photo-detector by Fresnel reflection, while blocking light propagating from the second optical fiber from being directed to the photo-detector, wherein an index of refraction of the core of the second optical fiber at the end of the second optical fiber differs from an index of refraction of the core of the first optical fiber at the end of the first optical fiber.

2. The optical device of claim 1, wherein the optical joint consists of an air gap between the ends of the first and second optical fibers.

3. The optical device of claim 1, wherein the optical joint includes a thin film coating applied to the end of one or both of the first and second optical fibers.

4. The optical device of claim 1, wherein the optical joint includes a thin film coating stack applied to the end of one or both of the first and second optical fibers.

5. The optical device of claim 1, wherein the end of the first optical fiber, the end of the second optical fiber, or the ends of both the first and second optical fibers are at an angle relative to an axis along which the core of the first optical fiber and the core of the second optical fiber are aligned.

6. The optical device of claim 1, wherein the end of the first optical fiber, the end of the second optical fiber, or the ends of both the first and second optical fibers are at an angle configured to reflect light incident thereupon by Fresnel reflection from the first optical fiber towards the photo-detector.

7. The optical device of claim 1, wherein the end of the first optical fiber and the end of the second optical fiber are butt coupled to each other at the optical joint.

8. The optical device of claim 1, wherein the end of the first optical fiber and the end of the second optical fiber are aligned by being held by a fiber holder.

9. The optical device of claim 1, wherein the portion of light propagating from the first optical fiber is directed to the photo-detector by the optical joint through a cladding of the first optical fiber.

10. The optical device of claim 9, wherein the photo-detector is optically coupled to the optical joint through a transparent material having an index of refraction matching an index of refraction of the cladding of the first optical fiber.

11. The optical device of claim 1, further comprising:
    a light absorbent material within which the optical joint and the photo-detector are encapsulated.

12. An optical device, comprising:
    a photo-detector;
    a first optical fiber having a core and an end;
    a second optical fiber having a core and an end adjacent to the end of the first optical fiber, the core of the first optical fiber aligned with the core of the second optical fiber to allow light to propagate through the end of the first optical fiber from the core of the first optical fiber to the core of the second optical fiber through the end of the second optical fiber and to allow light to propagate through the end of the second optical fiber from the core of the second optical fiber to the core of the first optical fiber through the end of the first optical fiber; and
    an optical joint between the end of the first optical fiber and the end of the second optical fiber, the photo-detector bonded to one or both of the first and second optical fibers in an area adjacent to the optical joint, wherein the optical joint is configured to allow light to propagate between the end of the first optical fiber and the end of the second optical fiber and to direct a portion of light propagating from the first optical fiber to be directed to the photo-detector by Fresnel reflection, while blocking light propagating from the second optical fiber from being directed to the photo-detector, wherein the optical joint includes a fiber stub through which the optical joint is configured to allow light to propagate between the end of the first optical fiber and the end of the second optical fiber, a core of the fiber stub having an index of refraction different from the index of refraction of the core of the first optical fiber at the end of the first optical fiber, the optical joint configured to direct a portion of light propagating from the first optical fiber to be directed to the photo-detector by Fresnel reflection from one or more of the end of the first optical fiber, the end of the second optical fiber, or an end of the optical joint.

13. The optical device of claim 12, wherein the optical joint includes a thin film coating applied to one or more of the end of the first fiber, the end of the second optical, and one or more ends of the fiber stub.

14. The optical device of claim 12, wherein the optical joint includes a thin film coating stack applied to applied to one or more of the end of the first fiber, the end of the second optical, and one or more ends of the fiber stub.

15. The optical device of claim 12, wherein the end of the first optical fiber, the end of the second optical fiber, or the ends of both the first and second optical fibers are at an angle relative to an axis along which the core of the first optical fiber and the core of the second optical fiber are aligned through the core of the fiber stub.

16. The optical device of claim 12, wherein the end of the first optical fiber, the end of the second optical fiber, or the ends of both the first and second optical fibers are at an angle configured to reflect light incident thereupon by Fresnel reflection from the first optical fiber or the fiber stub towards the photo-detector.

17. The optical device of claim 12, wherein the end of the first optical fiber and the end of the second optical fiber are each butt coupled to the fiber stub.

18. The optical device of claim 12, wherein the end of the first optical fiber, the fiber stub, and the end of the second optical fiber are aligned by being held by a fiber holder.

19. The optical device of claim 12, wherein the portion of light propagating from the first optical fiber is directed to the photo-detector by the optical joint through a cladding of the first optical fiber.

20. The optical device of claim 19, wherein the photo-detector is optically coupled to the optical joint through a transparent material having an index of refraction matching an index of refraction of the cladding of the first optical fiber.

21. The optical device of claim 12, further comprising:
a light absorbent material within which the optical joint and the photo-detector are encapsulated.

* * * * *